US010959300B2

(12) United States Patent
Davis et al.

(10) Patent No.: US 10,959,300 B2
(45) Date of Patent: Mar. 23, 2021

(54) INTEGRATED SENSOR MODULES FOR LIGHT FIXTURES

(71) Applicant: SIGNIFY HOLDING B.V., Eindhoven (NL)

(72) Inventors: Matthew Alan Davis, Orange, CA (US); Sridhar Reddy Nimma, Cumming, GA (US); John Trublowski, Troy, MI (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/240,006

(22) Filed: Jan. 4, 2019

(65) Prior Publication Data

US 2019/0208598 A1 Jul. 4, 2019

Related U.S. Application Data

(60) Provisional application No. 62/613,535, filed on Jan. 4, 2018.

(51) Int. Cl.
| | |
|---|---|
| *H05B 45/10* | (2020.01) |
| *F21V 23/04* | (2006.01) |
| *F21V 23/00* | (2015.01) |
| *H05B 45/40* | (2020.01) |
| *H05B 47/11* | (2020.01) |
| *H05B 45/00* | (2020.01) |
| *H05B 47/19* | (2020.01) |

(52) U.S. Cl.
CPC ........... *H05B 45/10* (2020.01); *F21V 23/007* (2013.01); *F21V 23/0471* (2013.01); *H05B 45/40* (2020.01); *H05B 47/11* (2020.01); *H05B 45/60* (2020.01); *H05B 47/19* (2020.01)

(58) Field of Classification Search
CPC .. F21V 23/007; F21V 23/0471; F21V 23/008; F21V 23/0442; H05B 45/10; H05B 45/60; H05B 47/11; H05B 47/19; F21Y 2115/10
See application file for complete search history.

(56) References Cited

U.S. PATENT DOCUMENTS

| | | | |
|---|---|---|---|
| 2006/0153558 A1* | 7/2006 | Tan | G01S 17/89 396/155 |
| 2007/0057807 A1* | 3/2007 | Walters | H04L 41/0853 340/7.29 |
| 2013/0106813 A1* | 5/2013 | Hotelling | G06F 1/1637 345/207 |
| 2014/0225513 A1* | 8/2014 | Park | F21V 23/0464 315/151 |

(Continued)

OTHER PUBLICATIONS

Christian Miner, EIC 2800 Search Report, Sep. 27, 2019, Scientific and Technical Information Center (Year: 2019).*

*Primary Examiner* — Raymond R Chai
(74) *Attorney, Agent, or Firm* — Patrick T. Driscoll

(57) ABSTRACT

A light fixture integrated disposed in an ambient environment can include at least one light source. The light fixture can also include a sensor module that measures a parameter, where the parameter is used to operate the at least one light source, where the sensor module is disposed on an exposed component, where the exposed component has a substantially unobstructed line of sight with the ambient environment, where the sensor module is used to measure the parameter in the ambient environment.

20 Claims, 9 Drawing Sheets

(56) References Cited

U.S. PATENT DOCUMENTS

| | | | |
|---|---|---|---|
| 2014/0363123 A1* | 12/2014 | Caporaso | G02B 1/005 |
| | | | 385/16 |
| 2016/0238201 A1* | 8/2016 | Ray | B65D 5/4216 |
| 2017/0018049 A1* | 1/2017 | Ray | G06Q 90/00 |
| 2017/0332458 A1* | 11/2017 | Salter | F21S 45/50 |
| 2019/0098725 A1* | 3/2019 | Sadwick | H05B 47/175 |

* cited by examiner

INTEGRATED SENSOR MODULES FOR LIGHT FIXTURES

CROSS-REFERENCE TO RELATED APPLICATIONS

This application claims priority under 35 U.S.C. § 119 to U.S. Provisional Patent Application Ser. No. 62/613,535, titled "Integrated Sensor Modules For Light Fixtures" and filed on Jan. 4, 2018, the entire contents of which are hereby incorporated herein by reference.

TECHNICAL FIELD

Embodiments described herein relate generally to light fixtures, and more particularly to systems, methods, and devices for sensor modules for light fixtures.

BACKGROUND

In an effort to conserve energy, one or more sensors (e.g., occupancy sensors, ambient light sensors) are used in lighting systems. In such a case, these sensors can be integrated with a control system. For example, when an occupancy sensor detects that one or more people are in a volume of space, a control system for one or more light fixtures in a lighting system will provide power and/or control signals to those light fixtures, causing those light fixtures to illuminate. Conversely, when the occupancy sensor fails to detect that one or more people are in a volume of space, a control system for one or more light fixtures in a lighting system will cause those light fixtures to stop illuminating.

SUMMARY

In general, in one aspect, the disclosure relates to a light fixture disposed in an ambient environment. The light fixture can include at least one light source. The light fixture can also include a sensor module that measures a parameter, where the parameter is used to operate the at least one light source, where the sensor module is disposed on an exposed component, where the exposed component has a substantially unobstructed line of sight with the ambient environment, where the sensor module is used to measure the parameter in the ambient environment.

In another aspect, the disclosure can generally relate to a sensor module for a light fixture. The sensor module can include a first dielectric configured to be layered on a substrate of the light fixture. The sensor module can also include a first electrode layered atop the first dielectric, where the first electrode comprises a first connection tail. The sensor module can further include a second electrode layered atop the first dielectric, where the second electrode includes a second connection tail that is configured to couple to a first component of the light fixture. The sensor module can also include a sensor in direct communication with the second electrode.

In yet another aspect, the disclosure can generally relate to a light fixture disposed in an ambient environment. The light fixture can include at least one light source. The light fixture can also include a sensor module that measures a parameter, where the parameter is unrelated to operation of the at least one light source, where the sensor module is disposed on an exposed component, where the exposed component has a substantially unobstructed line of sight with the ambient environment, where the sensor module is used to measure the parameter in the ambient environment.

These and other aspects, objects, features, and embodiments will be apparent from the following description and the appended claims.

BRIEF DESCRIPTION OF THE DRAWINGS

The drawings illustrate only example embodiments of integrated sensor modules for light fixtures and are therefore not to be considered limiting of its scope, as integrated sensor modules for light fixtures may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

Figure 1:
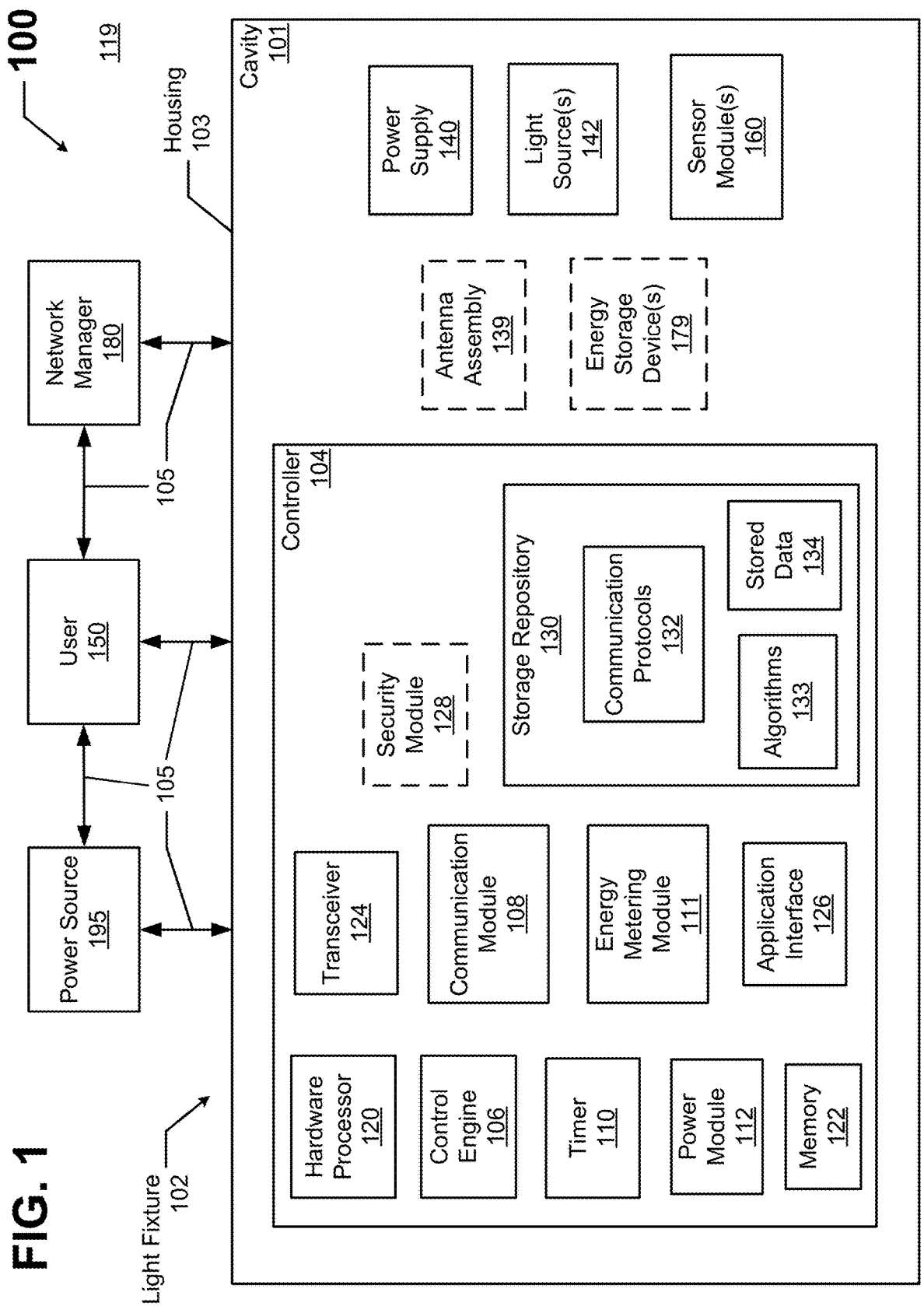
FIG. 1 shows a diagram of a lighting system that includes a light fixture in accordance with certain example embodiments.

The example embodiments discussed herein are directed to systems, methods, and devices for integrated sensor modules for light fixtures. Example integrated sensor modules can be used with one or more of a number of other electrical devices in addition to, or as an alternative to, light fixtures. Such other electrical devices can include, but are not limited to, a light switch, a control panel, a wall outlet, a smoke detector, a $CO_2$ monitor, a motion detector, a broken glass sensor, and a camera. Example embodiments can be used for a volume of space having any size and/or located in any environment (e.g., indoor, outdoor, hazardous, non-hazardous, high humidity, low temperature, corrosive, sterile, high vibration).

Light fixtures described herein can use one or more of a number of different types of light sources, including but not limited to light-emitting diode (LED) light sources, fluorescent light sources, organic LED light sources, incandescent light sources, and halogen light sources. Therefore, light fixtures described herein, even in hazardous locations, should not be considered limited to a particular type of light source. Further, a light source with which example integrated sensor modules can be used can be any of a number of types of light fixtures. Examples of such types of light fixtures can include, but are not limited to, a down can light, a pendant light, a street light, a Hi-Bay light, a floodlight, a beacon, a desk lamp, an emergency egress light, and a light integrated with a ceiling fan.

In certain example embodiments, light fixtures (or other devices) that include example integrated sensor modules are subject to meeting certain standards and/or requirements. For example, the National Electric Code (NEC), Underwriters Laboratory (UL), the National Electrical Manufacturers Association (NEMA), the International Electrotechnical Commission (IEC), the Federal Communication Commission (FCC), and the Institute of Electrical and Electronics Engineers (IEEE) set standards as to electrical enclosures (e.g., light fixtures), wiring, and electrical connections. Use of example embodiments described herein meet (and/or allow a corresponding device to meet) such standards when required. In some (e.g., PV solar) applications, additional standards particular to that application may be met by the light fixtures or other electrical devices described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of integrated sensor modules for light fixtures will be described more fully hereinafter with reference to the accompanying drawings, in which example embodiments of integrated sensor modules for light fixtures are shown. Integrated sensor modules for light fixtures may, however, be embodied in many different forms and should not be construed as limited to the example embodiments set forth herein. Rather, these example embodiments are provided so that this disclosure will be thorough and complete, and will fully convey the scope of integrated sensor modules for light fixtures to those of ordinary skill in the art. Like, but not necessarily the same, elements (also sometimes called components) in the various figures are denoted by like reference numerals for consistency.

Terms such as "first", "second", "on", "upon", "outer", "inner", "top", "bottom", and "within" are used merely to distinguish one component (or part of a component or state of a component) from another. Such terms are not meant to denote a preference or a particular orientation, and are not meant to limit embodiments of integrated sensor modules for light fixtures. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of a lighting system 100 that includes an integrated sensor module 160 for a light fixture 102 in accordance with certain example embodiments. The lighting system 100 is located in an ambient environment 119 and can include a power source 195, a user 150, a network manager 180, and at least one light fixture 102. In addition to the one or more sensor modules 160, the light fixture 102 can include a controller 104, one or more optional energy storage devices 179, one or more optional antenna assemblies 139 (also sometimes more simply called an antenna 139 herein), at least one power supply 140, and at least one light source 142. The controller 104 can include one or more of a number of components. As shown in FIG. 1, such components can include, but are not limited to, a control engine 106, a communication module 108, a timer 110, an energy metering module 111, a power module 112, a storage repository 130, a hardware processor 120, a memory 122, a transceiver 124, an application interface 126, and, optionally, a security module 128. The components shown in FIG. 1 are not exhaustive, and in some embodiments, one or more of the components shown in FIG. 1 may not be included in an example light fixture. Any component of the example light fixture 102 can be discrete or combined with one or more other components of the light fixture 102.

A user 150 can be any person that interacts with light fixtures or components thereof (e.g., an antenna assembly 139, a sensor module 160). Examples of a user 150 may include, but are not limited to, an engineer, an electrician, an instrumentation and controls technician, a mechanic, an operator, a consultant, an inventory management system, an inventory manager, a foreman, a labor scheduling system, a contractor, and a manufacturer's representative. The user 150 can use a user system (not shown), which may include a display (e.g., a GUI). The user 150 interacts with (e.g., sends data to, receives data from) the controller 104 of the light fixture 102 via the application interface 126 (described below). The user 150 can also interact with a network manager 180 and/or one or more of the sensor modules 160.

Interaction between the user 150 and the light fixture 102, the network manager 180, the power source 195, and the sensor modules 160 is conducted using communication links 105. Each communication link 105 can include wired (e.g., Class 1 electrical cables, Class 2 electrical cables, electrical connectors, power line carrier, DALI, RS485) and/or wireless (e.g., Wi-Fi, visible light communication, cellular networking, Bluetooth, WirelessHART, ISA100) technology. For example, a communication link 105 can be (or include) one or more electrical conductors that are coupled to the housing 103 of the light fixture 102 and to a sensor module 160. The communication link 105 can transmit signals (e.g., power signals, communication signals, control signals, data) between the light fixture 102 and the user 150, the network manager 180, the power source 195, and/or one or more of the sensor modules 160.

The network manager 180 is a device or component that controls all or a portion of a communication network that includes the controller 104 of the light fixture 102, additional light fixtures, and the sensor modules 160 that are communicably coupled to the controller 104. The network manager 180 can be substantially similar to the controller 104. Alternatively, the network manager 180 can include one or more of a number of features in addition to, or altered from, the features of the controller 104 described below. As described herein, communication with the network manager 180 can include communicating with one or more other components (e.g., another light fixture) of the system 100. In such a case, the network manager 180 can facilitate such communication.

The power source 195 of the system 100 provides AC mains or some other form of power to the light fixture 102, as well as to one or more other components (e.g., the network manager 180) of the system 100. The power source 195 can include one or more of a number of components. Examples of such components can include, but are not limited to, an electrical conductor, a coupling feature (e.g., an electrical connector), a transformer, an inductor, a resistor, a capacitor, a diode, a transistor, and a fuse. The power source 195 can be, or include, for example, a wall outlet, an energy storage device (e.g. a battery, a supercapacitor), a circuit breaker, and/or an independent source of generation (e.g., a photovoltaic solar generation system). The power source 195 can also include one or more components (e.g., a switch, a relay, a controller) that allow the power source 195 to communicate with and/or follow instructions from the user 150, the controller 104, and/or the network manager 180.

An optional energy storage device 179 can be any of a number of rechargeable batteries or similar storage devices that are configured to charge using some source of power (e.g., the primary power provided to the light fixture, ultraviolet rays). The energy storage device 179 can use one or more of any type of storage technology, including but not limited to a battery, a flywheel, an ultracapacitor, and a supercapacitor. If the energy storage device 179 includes a battery, the battery technology can vary, including but not limited to lithium ion, nickel-cadmium, lead/acid, solid state, graphite anode, titanium dioxide, nickel cadmium, nickel metal hydride, nickel iron, alkaline, and lithium polymer. In some cases, one or more of the energy storage devices 179 charge using a different level and/or type of power relative to the level and type of power of the primary power. In such a case, the power supply 179 can convert, invert, transform, and/or otherwise manipulate the primary power to the level and type of power used to charge the energy storage devices 179. There can be any number of energy storage devices 179.

The optional antenna assembly 139 can be any assembly of components that is used to improve the ability of the light fixture 102 (or portion thereof, such as the transceiver 124 or a sensor module 160) to send and/or receive signals with the network manager 180, the power source 195, the user 150, another light fixture, a remote sensor module 160, and/or some other device within the lighting system 100. The antenna assembly 139 can be used to convert electrical power into radio waves and/or convert radio waves into electrical power. An antenna assembly 139 can be used with a single component (e.g., only a sensor module 160) of the light fixture 102. Alternatively, an antenna assembly 139 can be used with multiple components (e.g. a sensor module 160, the controller 104) of the light fixture 102.

In certain example embodiments, the antenna assembly 139 includes one or more of a number of components. Such components can include, but are not limited to, a receiver, a transmitter, a balun, a block upconverter, a cable (e.g., a coaxial cable or other form of communication link 105), a counterpoise (a type of ground system), a feed, a passive radiator, a feed line, a rotator, a tuner, a low-noise block downconverter, and a twin lead. Portions of the antenna assembly 139 can be in direct communication with, or can be shared with, one or more components (e.g., the communications module 108) of the controller 104 and/or a sensor module 160. For example, the transceiver 124 of the controller 104 and/or a sensor module 160 can be in direct communication with the antenna assembly 139.

The one or more example sensor modules 160 can include any type of sensing device that measure one or more parameters. Examples of types of sensor modules 160 can include, but are not limited to, a passive infrared sensor, a photocell, a pressure sensor, an air flow monitor, a gas detector, and a resistance temperature detector. A parameter that can be measured by a sensor module 160 can include, but is not limited to, occupancy, motion, an amount of ambient light, temperature within the housing 103 of the light fixture 102, humidity within the housing 103 of the light fixture 102, air quality within the housing 103 of the light fixture 102, vibration, pressure, air flow, smoke (as from a fire), temperature (e.g., excessive heat, excessive cold, an ambient temperature) outside the housing 103 of the light fixture 102, detection of a gas, and humidity in the ambient environment 119. More details about example sensor modules 160 are provided in the figures below.

In some cases, the parameter or parameters measured by a sensor module 160 can be used to operate one or more light sources 142 of the light fixture 102. Each sensor module 160 can use one or more of a number of communication protocols. A sensor module 160 can be associated with the light fixture 102 or another light fixture in the system 100. A sensor module 160 can be located within the housing 103 of the light fixture 102, disposed on the housing 103 of the light fixture 102, or located outside the housing 103 of the light fixture 102.

In certain example embodiments, a sensor module 160 can include an energy storage device (e.g., a battery) that is used to provide power, at least in part, to some or all of the sensor module 160. In such a case, the energy storage device can be the same as, or independent of, the energy storage device 179, described above, of the light fixture 102. The energy storage device of the sensor module 160 can operate at all time or when a primary source of power to the light fixture 102 is interrupted. Further, a sensor module 160 can utilize or include one or more components (e.g., memory 122, storage repository 130, transceiver 124) found in the controller 104. In such a case, the controller 104 can provide the functionality of these components used by the sensor module 160. Alternatively, the sensor module 160 can include, either on its own or in shared responsibility with the controller 104, one or more of the components of the controller 104. In such a case, the sensor module 160 can correspond to a computer system as described below with regard to FIG. 2.

A sensor module 160 in example embodiments can be at least partially disposed within the housing 103 of the light fixture 102. As another example, an entire sensor module 160 (or portions thereof) can be disposed on (integrated with) the housing 103 of the light fixture 102. Example sensor modules 160 (or portions thereof) described herein can be printed on an outer surface of the housing 103 of the light fixture 102 or printed on an information medium (e.g., a warning label, a nameplate) that is adhered or otherwise coupled to the outer surface of the housing 103 of the light fixture 102.

The user 150, the network manager 180, the power source 195, and/or the sensor modules 160 can interact with the controller 104 of the light fixture 102 using the application interface 126 in accordance with one or more example embodiments. Specifically, the application interface 126 of the controller 104 receives data (e.g., information, communications, instructions, updates to firmware) from and sends data (e.g., information, communications, instructions) to the user 150, the network manager 180, the power source 195, and/or each sensor module 160. The user 150, the network manager 180, the power source 195, and/or each sensor module 160 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150, the network manager 180, the power source 195, and/or the sensor modules 160 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, sensor software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The light fixture 102 can include a housing 103. The housing 103 can include at least one wall that forms a cavity 101. In some cases, the housing can be designed to comply with any applicable standards so that the light fixture 102 can be located in a particular environment (e.g., outdoors, in an indoor "clean room").

The housing 103 of the light fixture 102 can be used to house one or more components of the light fixture 102, including one or more components of the controller 104. For example, as shown in FIG. 1, the controller 104 (which in this case includes the control engine 106, the communication module 108, the timer 110, the energy metering module 111, the power module 112, the storage repository 130, the hardware processor 120, the memory 122, the transceiver 124, the application interface 126, and the optional security module 128), one or more of the sensor modules 160, one or more optional antenna assemblies 139, the power supply 140, and the light sources 142 are disposed in the cavity 101 formed by the housing 103. In alternative embodiments, any one or more of these or other components of the light fixture 102 can be disposed on the housing 103 and/or remotely from the housing 103. For instance, an example sensor module 160 (or portion thereof) can be integrated with the housing 103.

The storage repository 130 can be a persistent storage device (or set of devices) that stores software and data used to assist the controller 104 in communicating with the user 150, the network manager 180, the power source 195, and one or more sensor modules 160 within the system 100. In one or more example embodiments, the storage repository 130 stores one or more communication protocols 132, algorithms 133, and stored data 134. The communication protocols 132 can be any of a number of protocols that are used to send and/or receive data between the controller 104 and the user 150, the network manager 180, the power source 195, and one or more sensor modules 160.

One or more of the communication protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 132 can provide a layer of security to the data transferred within the system 100. Other protocols 132 can be associated with the use of Wi-Fi, Zigbee, visible light communication, cellular networking, BLE, and Bluetooth.

The algorithms 133 can be any procedures (e.g., a series of method steps), formulas, logic steps, mathematical models, forecasts, simulations, and/or other similar operational procedures that the control engine 106 of the controller 104 follows based on certain conditions at a point in time. An example of an algorithm 133 is measuring (using the energy metering module 111), storing (using the stored data 134 in the storage repository 130), and evaluating the current and voltage delivered to and delivered by the power supply 140 over time.

Algorithms 133 can be focused on certain components of the light fixture 102. For example, one or more algorithms 133 can facilitate communication between a sensor module 160 and the control engine 106 of the controller 104. As a specific example, one or more algorithms 133 can be used by the control engine 106 to instruct a sensor module 160 (in some cases, using an antenna assembly 139) to measure a parameter, for the sensor module 160 to send the measurement to the control engine 106, for the control engine 106 to analyze the measurement, (stored as stored data 134) and for the control engine 106 to take an action (e.g., instruct, using a communication protocol 132, one or more other components of the light fixture 102 to operate) based on the result (stored as stored data 134) of the analysis.

As another example, one or more algorithms 133 can facilitate communication between a sensor module 160 and the control engine 106 of the controller 104. As a specific example, one or more algorithms 133 can be used by the control engine 106 to receive a measurement (using a communication protocol 132) made by a sensor module 160, for the control engine 106 to analyze the measurement, and for the control engine 106 to take an action (e.g., instruct one or more other components of the light fixture 102 to operate) based on the result of the analysis. As another specific example, one or more algorithms 133 can be used by the control engine 106 to determine that a communication to a device external to the light fixture 102 needs to be sent, and to send a communication signal (using a communication protocol 132 and saved as stored data 134), in some cases using the optional antenna assembly 139.

Stored data 134 can be any data associated with the light fixture 102 (including other light fixtures and/or any components thereof), any measurements taken by the sensor modules 160, measurements taken by the energy metering module 111, threshold values, results of previously run or calculated algorithms, and/or any other suitable data. Such data can be any type of data, including but not limited to historical data for the light fixture 102, historical data for other light fixtures, calculations, measurements taken by the energy metering module 111, and measurements taken by one or more sensor modules 160. The stored data 134 can be associated with some measurement of time derived, for example, from the timer 110.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the communication protocols 132, the algorithms 133, and/or the stored data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the network manager 180, the power source 195, and the sensor modules 160 in the system 100. More specifically, the control engine 106 sends information to and/or receives information from the storage repository 130 in order to communicate with the user 150, the network manager 180, the power source 195, and the sensor modules 160. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can activate the communication module 108 when the communication module 108 is in "sleep" mode and when the communication module 108 is needed to send data received from another component (e.g., a sensor module 160, the user 150) in the system 100.

As another example, the control engine 106 can acquire the current time using the timer 110. The timer 110 can enable the controller 104 to control the light fixture 102 even when the controller 104 has no communication with the network manager 180. As yet another example, the control engine 106 can direct the energy metering module 111 to measure and send power consumption information of the light fixture 102 to the network manager 180. In some cases, the control engine 106 of the controller 104 can generate and send a dimming signal (e.g., 0-10 V DC) to the power supply 140, which causes the power supply 140 to adjust the light output of the light sources 142.

The control engine 106 of the controller 104 can communicate, in some cases using the antenna assembly 139, with one or more of the example sensor modules 160 and make determinations based on measurements made by the example sensor modules 160. For example, the control engine 106 can use one or more algorithms 133 to facilitate communication with a sensor module 160. As a specific example, the control engine 106 can use one or more algorithms 133 to instruct a sensor module 160 to measure a parameter, for the sensor module 160 to send the measurement to the control engine 106, for the control engine 106 to analyze the measurement, (stored as stored data 134) and for the control engine 106 to take an action (e.g., instruct, using a communication protocol 132, one or more other components of the light fixture 102 to operate) based on the result (stored as stored data 134) of the analysis.

The control engine 106 can also send and/or receive communications. As a specific example, the control engine 106 can use one or more algorithms 133 to receive (using a communication protocol 132) a signal (e.g., received by the antenna assembly 139), for the control engine 106 to analyze the signal, and for the control engine 106 to take an action (e.g., instruct one or more other components of the light fixture 102 to operate) based on the result of the analysis. As another specific example, the control engine 106 can use one or more algorithms 133 to determine that a communication to a device external to the light fixture 102 needs to be sent, and to send a communication signal (using a communication protocol 132 and saved as stored data 134), in some cases using the antenna assembly 139.

The control engine 106 can provide control, communication, and/or other similar signals to the user 150, the network manager 180, the power source 195, and one or more of the sensor modules 160. Similarly, the control engine 106 can receive control, communication, and/or other similar signals from the user 150, the network manager 180, the power source 195, and one or more of the sensor modules 160. The control engine 106 can control each sensor module 160 automatically (for example, based on one or more algorithms stored in the control engine 106) and/or based on control, communication, and/or other similar signals received from another device through a communication link 105. The control engine 106 may include a printed circuit board, upon which the hardware processor 120 and/or one or more discrete components of the controller 104 are positioned.

In certain embodiments, the control engine 106 of the controller 104 can communicate with one or more components of a system external to the system 100. For example, the control engine 106 can interact with an inventory management system by ordering a light fixture (or one or more components thereof) to replace the light fixture 102 (or one or more components thereof) that the control engine 106 has determined to fail or be failing. As another example, the control engine 106 can interact with a workforce scheduling system by scheduling a maintenance crew to repair or replace the light fixture 102 (or portion thereof) when the control engine 106 determines that the light fixture 102 or portion thereof requires maintenance or replacement. In this way, the controller 104 is capable of performing a number of functions beyond what could reasonably be considered a routine task.

In certain example embodiments, the control engine 106 can include an interface that enables the control engine 106 to communicate with one or more components (e.g., power supply 140) of the light fixture 102. For example, if the power supply 140 of the light fixture 102 operates under IEC Standard 62386, then the power supply 140 can have a serial communication interface that will transfer data (e.g., stored data 134) measured by the sensor modules 160. In such a case, the control engine 106 can also include a serial interface to enable communication with the power supply 140 within the light fixture 102. Such an interface can operate in conjunction with, or independently of, the communication protocols 132 used to communicate between the controller 104 and the user 150, the network manager 180, the power source 195, and the sensor modules 160.

The control engine 106 (or other components of the controller 104) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The communication module 108 of the controller 104 determines and implements the communication protocol (e.g., from the communication protocols 132 of the storage repository 130) that is used when the control engine 106 communicates with (e.g., sends signals to, receives signals from) the user 150, the network manager 180, the power source 195, and/or one or more of the sensor modules 160. In some cases, the communication module 108 accesses the stored data 134 to determine which communication protocol is used to communicate with the sensor module 160 associated with the stored data 134. In addition, the communication module 108 can interpret the communication protocol of a communication received by the controller 104 so that the control engine 106 can interpret the communication.

The communication module 108 can send and receive data between the network manager 180, the power source 195, the sensor modules 160, and/or the users 150 and the controller 104. The communication module 108 can send and/or receive data in a given format that follows a particular communication protocol 132. The control engine 106 can interpret the data packet received from the communication module 108 using the communication protocol 132 information stored in the storage repository 130. The control engine 106 can also facilitate the data transfer between one or more sensor modules 160 and the network manager 180 or a user 150 by converting the data into a format understood by the communication module 108.

The communication module 108 can send data (e.g., communication protocols 132, algorithms 133, stored data 134, operational information, alarms) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from the user 150, based on an instruction programmed in the software for the controller 104, based on some other condition or from some other component, or from any combination thereof.

The timer 110 can be configured to track time when there is no power delivered to the controller 104 (e.g., the power module 112 malfunctions) using, for example, a super capacitor or a battery backup. In such a case, when there is a resumption of power delivery to the controller 104, the timer 110 can communicate any aspect of time to the controller 104. In such a case, the timer 110 can include one or more of a number of components (e.g., a super capacitor, an integrated circuit) to perform these functions.

The energy metering module 111 of the controller 104 measures one or more components of power (e.g., current, voltage, resistance, VARs, watts) at one or more points within the light fixture 102. The energy metering module 111 can include any of a number of measuring devices and related devices, including but not limited to a voltmeter, an ammeter, a power meter, an ohmmeter, a current transformer, a potential transformer, and electrical wiring. The energy metering module 111 can measure a component of power continuously, periodically, based on the occurrence of an event, based on a command received from the control module 106, and/or based on some other factor. For purposes herein, the energy metering module 111 can be considered a type of sensor (e.g., sensor module 160). In this way, a component of power measured by the energy metering module 111 can be considered a parameter herein.

In certain example embodiments, the power module 112 of the controller 104 receives power from the power supply 195 and manipulates (e.g., transforms, rectifies, inverts) that power to provide the manipulated power to one or more other components (e.g., timer 110, control engine 106) of the controller 104. Alternatively, in certain example embodiments, the power module 112 can provide power to the power supply 140 of the light fixture 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112.

The power module 112 can include one or more components (e.g., a transformer, a diode bridge, an inverter, a converter) that receives power (for example, through an electrical cable) from a source external to the light fixture 102 and generates power of a type (e.g., alternating current, direct current) and level (e.g., 12V, 24V, 120V) that can be used by the other components of the controller 104 and/or by the power supply 140. The power module 112 can use a closed control loop to maintain a preconfigured voltage or current with a tight tolerance at the output. The power module 112 can also protect the rest of the electronics (e.g., hardware processor 120, transceiver 124) in the light fixture 102 from surges generated in the line.

In addition, or in the alternative, the power module 112 can be a source of power in itself to provide signals to the other components of the controller 104 and/or the power supply 140. For example, the power module 112 can be a battery. As another example, the power module 112 can be a localized photovoltaic power system. The power module 112 can also have sufficient isolation in the associated components of the power module 112 (e.g., transformers, opto-couplers, current and voltage limiting devices) so that the power module 112 is certified to provide power to an intrinsically safe circuit.

In certain example embodiments, the power module 112 of the controller 104 can also provide power and/or control signals, directly or indirectly, to one or more of the sensor modules 160. In such a case, the control engine 106 can direct the power generated by the power module 112 to the sensor modules 160 of the light fixture 102. In this way, power can be conserved by sending power to the sensor modules 160 of the light fixture 102 when those devices need power, as determined by the control engine 106.

The hardware processor 120 of the controller 104 executes software, algorithms, and firmware in accordance with one or more example embodiments. Specifically, the hardware processor 120 can execute software on the control engine 106 or any other portion of the controller 104, as well as software used by the user 150, the network manager 180, the power source 195, and/or one or more of the sensor modules 160. The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals. Specifically, the transceiver 124 can be used to transfer data between the controller 104 and the user 150, the network manager 180, the power source 195, and/or the sensor modules 160. The transceiver 124 can use wired and/or wireless technology. The transceiver 124 can be configured in such a way that the control and/or communication signals sent and/or received by the transceiver 124 can be received and/or sent by another transceiver that is part of the user 150, the network manager 180, the power source 195, and/or the sensor modules 160. The transceiver 124 can use any of a number of signal types, including but not limited to radio signals. In some cases, the transceiver 124 can be part of, or at least in communication with, the antenna assembly 139.

When the transceiver 124 uses wireless technology, any type of wireless technology can be used by the transceiver 124 in sending and receiving signals. Such wireless technology can include, but is not limited to, Wi-Fi, Zigbee, visible light communication, cellular networking, Bluetooth Low Energy (BLE), and Bluetooth. The transceiver 124 can use one or more of any number of suitable communication protocols (e.g., ISA100, HART) when sending and/or receiving signals. Such communication protocols can be stored in the communication protocols 132 of the storage repository 130. Further, any transceiver information for the user 150, the network manager 180, the power source 195, and/or the sensor modules 160 can be part of the stored data 134 (or similar areas) of the storage repository 130.

Optionally, in one or more example embodiments, the security module 128 secures interactions between the controller 104, the user 150, the network manager 180, the power source 195, and/or the sensor modules 160. More specifically, the security module 128 authenticates communication from software based on security keys verifying the identity of the source of the communication. For example, user software may be associated with a security key enabling the software of the user 150 to interact with the controller 104 and/or the sensor modules 160. Further, the security module 128 can restrict receipt of information, requests for information, and/or access to information in some example embodiments.

As mentioned above, aside from the controller 104 and its components, the light fixture 102 can include a power supply 140 and one or more light sources 142. The light sources 142 of the light fixture 102 are devices and/or components typically found in a light fixture to allow the light fixture 102 to operate. The light fixture 102 can have one or more of any number and/or type of light sources 142. The light sources 142 can include any of a number of components, including but not limited to a local control module, a light source, a light engine, a heat sink, an electrical conductor or electrical cable, a terminal block, a lens, a diffuser, a reflector, an air moving device, a baffle, a dimmer, and a circuit board. A light source 142 can use any type of lighting technology, including but not limited to LED, incandescent, sodium vapor, and fluorescent.

The power supply 140 of the light fixture 102 provides power to one or more of the light sources 142. The power supply 140 can be called by any of a number of other names, including but not limited to a driver, a LED driver, and a ballast. The power supply 140 can be substantially the same as, or different than, the power module 112 of the controller 104. For example, the power supply 140 can include one or more of a number of single or multiple discrete components (e.g., transistor, diode, resistor), and/or a microprocessor. As another example, the power supply 140 may include a printed circuit board, upon which the microprocessor and/or one or more discrete components are positioned, and/or a dimmer.

The power supply 140 can include one or more components (e.g., a transformer, a diode bridge, an inverter, a converter) that receives power (for example, through an electrical cable) from the power module 112 of the controller 104 and generates power of a type (e.g., alternating current, direct current) and level (e.g., 12V, 24V, 120V) that can be used by the light sources 142. In addition, or in the alternative, the power supply 140 can receive power from a source external to the light fixture 102. In addition, or in the alternative, the power supply 140 can be a source of power in itself. For example, the power supply 140 can be a battery, a localized photovoltaic power system, or some other source of independent power.

As stated above, the light fixture 102 can be placed in any of a number of environments. In such a case, the housing 103 of the light fixture 102 can be configured to comply with applicable standards for any of a number of environments. This compliance with applicable standards can be upheld when at least a portion of an example sensor module 160 is integrated with the housing 103 of the light fixture 102.

Figure 2:
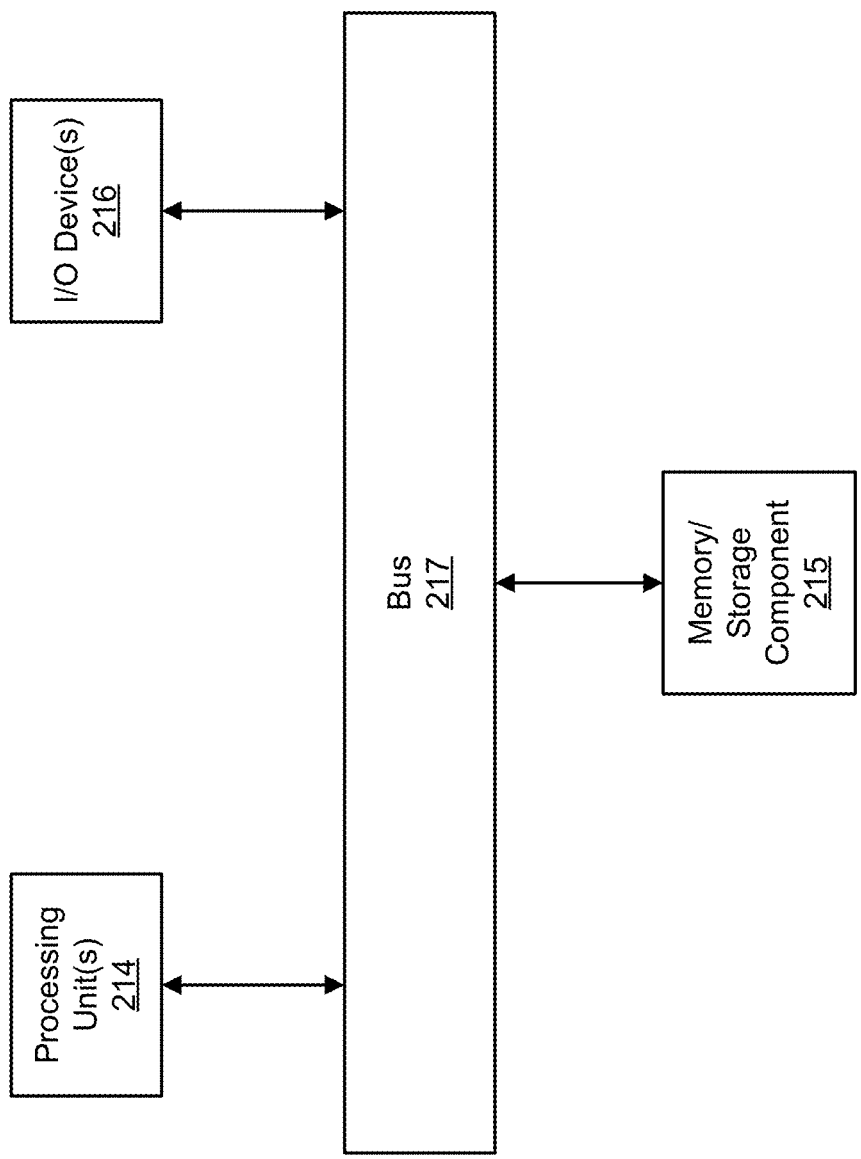
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
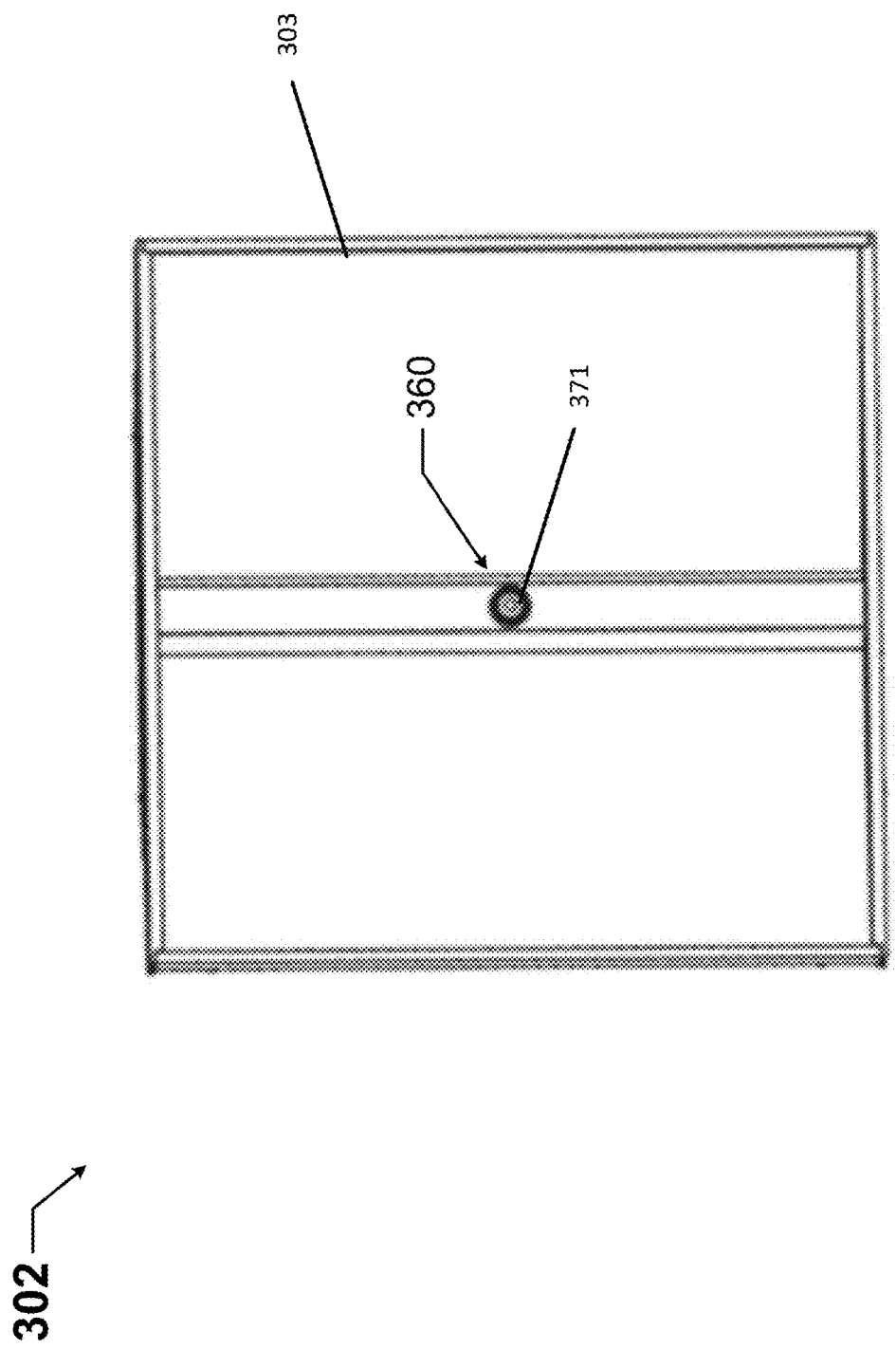
FIG. 3 shows a bottom view of another light fixture currently used in the art.

FIG. 3 shows a bottom view of a light fixture 302 currently used in the art. Referring to FIGS. 1-3, the light fixture 302 of FIG. 3 includes a sensor module 360 that is coupled to the housing 303 of the light fixture 302. In this case, the sensor module 360 includes an occupancy sensor (hidden from view) and a lens 371. The lens 371 is used to direct infrared energy to the sensor. The sensor module 360 protrudes outward from the housing 303 of the light fixture 302 and is visible when the light fixture 302 is installed. As a result, the sensor module 360 of the current art is very noticeable and aesthetically unappealing.

If the sensor 360 is an ambient light sensor, there are generally two types currently used in the art. The most common type of ambient light sensor is the cadmium disulfide (CdS) sensor. These photoconductive devices have components that change resistance based upon the amount of light that falls upon the sensor surface. They are usually used within a voltage divider circuit in an analog dimmer. The most common form of CdS cell is a discrete component with radial leads. The CdS cell requires a through-hole circuit board and a mechanical support structure. However, the CdS cells are not of consistent output and cause some variation in dimming circuits.

Another type of ambient light sensor is a silicon-based surface-mounted sensor. The output of these sensors is either an analog or digital output. Silicon style light sensors are more accurate and have a smaller footprint but the sensor must be mounted on a circuit board. With many light fixtures, the mechanical location of the circuit board is not optimal for the performance of the light sensor, and so special provisions need to be made to collect and direct the light to the sensor. This adds cost and complexity to the fixture design.

Current luminaire designs, such as is shown in FIG. 3, consist of numerous sub-assemblies (e.g., LED circuit boards, control circuit boards, communication circuit boards, sensor modules and assemblies, optical assemblies) that are designed and manufactured individually and assembled together subsequently into the housing (e.g., housing 303) to yield the final light fixture (e.g., light fixture 302). This design approach requires many fasteners, electrical interconnects and discrete wiring to provide sufficient mechanical and electrical integrity between the subassemblies.

In addition, packaging of the discrete elements can compromise the aesthetic appearance of the light fixture and even the performance of the light fixture since many of the sub-assemblies are manufactured with generic form factors that must be "fit" into the final design. Further, new trends in "smart lighting" are integrating extensive sensor capability to provide the user with real time information pertinent to the lighting application. The appearance of the light fixture, however, is expected to remain aesthetically pleasing, conform to customer size requirements, and be unobtrusive, which is contrary to the current practice of simply adding another sensor sub-assembly.

The example embodiments shown and described below overcome these shortcomings of the current art. For example, additive printing techniques can be used to apply components of sensor modules (e.g., ambient light sensors) to various surfaces of a light fixture. A sensor module (or portions thereof) can be printed as part of a circuit board on the same surface as the light sources (e.g., light sources 142) of the light fixture (e.g., light fixture 102). As another example, a sensor module can be printed on the housing (e.g., housing 103) of the light fixture (e.g., light fixture 102).

Multiple sensor modules (or components thereof) can be printed in more than one location on the fixture. The data from these multiple sensor modules can be averaged to get a more accurate reading of the parameter (e.g., ambient light) being measured. The sensor modules can also be printed on an information medium (e.g., a label, a nameplate) that can be wrapped around surfaces (e.g., the housing of a light fixture) so that the data collection is from multiple axes. The sensor modules can be printed on three dimensional parts that include a complete sensor with integrated connector and fastening provisions. The size of the actual surface of a sensor module can be scaled for voltage tuning.

Using lamination techniques, materials such as PET, PC or ETFE can be added as a top layer for weather protection of fixtures used in outdoor, humid, or other environments that require such protection to ensure reliable operation of the light fixture. These over layers, some of which are shown below, can use dichroic coatings to narrow the light spectrum that is exposed to the surface of the sensor module (as for when the sensor module measures ambient light).

By removing the packaging associated with the discrete sensors in the currently-existing art and integrating the mechanical and electrical functions directly with the actual luminaire package (e.g., the housing, a circuit board), efficiencies in manufacturing and performance can be achieved. Printing the sensor module directly onto a circuit board that includes the light sources goes one step further by providing a synergistic interaction with the structure that is not obtained using the traditional packaging approaches.

Formation of the sensing elements in the sensor modules currently used in the art can follow a number of processes, including use of active materials that generate a physical response upon exposure to a specific input. One such example is a Cadmium Sulfide crystal, which changes electrical resistance as a function of impinging light intensity. These materials can be inorganic or organic in nature. When processed to particular forms (like powders), these can often be mixed with binders and solvents to form a viscous liquid (ink) which can then be applied to a substrate using various printing processes. These inks can be cured using heat, UV or coalescence to drive off solvents and activate the binders forming a uniform film of the sensing material and creating the sensing element. Conductive and dielectric inks are formed in a similar manner and printed in sequential layers with the sensing material to form the functional sensor.

In a traditional, packaged sensor, these inks are applied to a substrate and connected to a circuit board (containing additional sensor conditioning and conversion circuits, a heat sink, or some other component of a light fixture) via wiring (e.g., communication links 105). Additional wiring with a connector can then be attached to a circuit board, which is then placed into a mechanical housing ready to be bolted into the light fixture.

Example embodiments described herein propose to deposit the sensor module directly onto the luminaire substrate (circuit board) or housing using the printed/layered approach. In doing so, interconnection to existing printed circuitry can be made directly with the inks (thereby eliminating the wiring and connectors); utilize the material (e.g., aluminum) of the substrate for heat sinking, antenna ground plane, and EMC shielding (if necessary); and be formed in multiple locations at low cost (for improved sensitivity, targeted measurement, and accuracy). Example sensor modules can be printed onto both sides of a circuit board and/or the three-dimensional structure of a housing wall for potential benefits such as improving directional sensitivity.

In addition, directly printing sensors on a structure in accordance with example embodiments can be used for diagnostics, where the sensor can measure parameters such as temperature, ambient light, occupancy, and light output. Further, directly printing sensors on a structure in accordance with example embodiments can be used for data collection that may or may not have a direct correlation to operation of the light fixture. Examples of such data that can be collected can include, but are not limited to, weather, air quality, stress/strain on the exposed component, temperature of the exposed component, and status/identification of wireless communications.

The location of the sensors on the light fixture in accordance with example embodiments can be advantageous for placing the sensor module in a location that can be environmentally protected in the ambient environment in which the light fixture is placed. For example, the sensor module can be place at a location on the light fixture that avoids direct and prolonged exposure to ultraviolet radiation. As another example, the sensor module can be placed at a location on the light fixture that avoids physical impacts that can occur on the light fixture.

Figure 4:
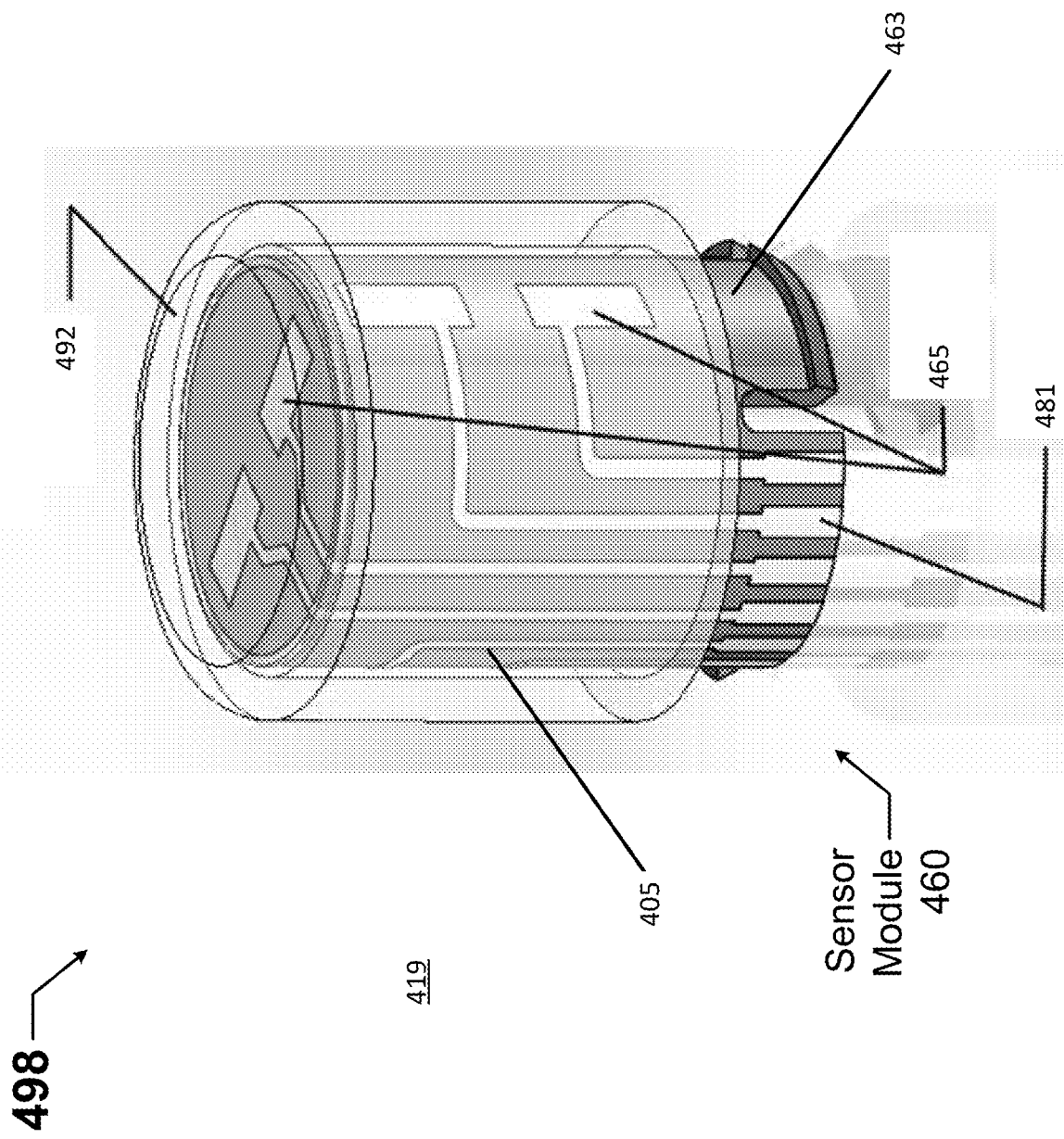
FIG. 4 shows a subassembly of a light fixture that includes a sensor module in accordance with certain example embodiments.

FIG. 4 shows a subassembly 498 of a light fixture that includes a sensor module 460 in accordance with certain example embodiments. Referring to FIGS. 1-4, the subassembly 498 of FIG. 4 includes the sensor module 460 covered, at least in part, by a protective cover 492. The sensor module 460 can include one or more of a number of components. For example, in this case, the sensor module 460 can include a number of sensors 465, where each sensor 465 is disposed at the distal end of a communication link 405 (e.g., a wire trace).

The proximal end of each communication link 405 terminates at a connection tail 481 (a type of coupling feature), which is configured to couple to a complementary coupling feature of another component (e.g., a controller, the power source) of the light fixture. The connection tail 481, the communication links 405, and the sensors 465 of the sensor module 460 in this example are all disposed on (e.g., printed, adhered) an outer surface of a substrate 463 (e.g., a housing for the sensor module 460). The substrate 463 or body 463 can be of any two- or three-dimensional shape and size. For example, in this case, the substrate 463 (also called a body 463) is cylindrical with an open bottom end. As can be seen in FIG. 4, the sensors 465 are disposed at multiple locations both on the top and on the side wall of the substrate 463. In total, the sensor module 460 of FIG. 4 has six sensors 465, two of which are hidden from view.

In some cases, a single sensor 465 in accordance with example embodiments can support two-dimensional or three-dimensional directional control to measure one or more parameters in a target volume of space within the ambient environment 419. Similarly, multiple sensors 465 in accordance with example embodiments can work in a coordinated configuration to support two-dimensional or three-dimensional directional control to measure one or more parameters in a target volume of space within the ambient environment 419.

The protective cover 492 can cover or shroud some or all of the sensor module 460. In this case, the protective cover 492 covers all of the sensor module 460 except for the connection tail 481 and the bottom portion of the substrate 463 adjacent to the connection tail 481. The protective cover 492 can be opaque to allow (provide a clear line of site for) the one or more sensors 465 of the sensor module 460 to measure a parameter in the ambient environment 419.

The assembly 498 of FIG. 4 can be coupled to any portion of a light fixture. For example, the assembly 498, using the connection tail 481 of the sensor module 460, can be coupled to a circuit board within a cavity formed by a lens and the housing of a light fixture. As another example, the assembly 498, using the connection tail 481 of the sensor module 460, can be coupled to wall (e.g., a top wall, a side wall) of the housing of a light fixture.

Figure 5:
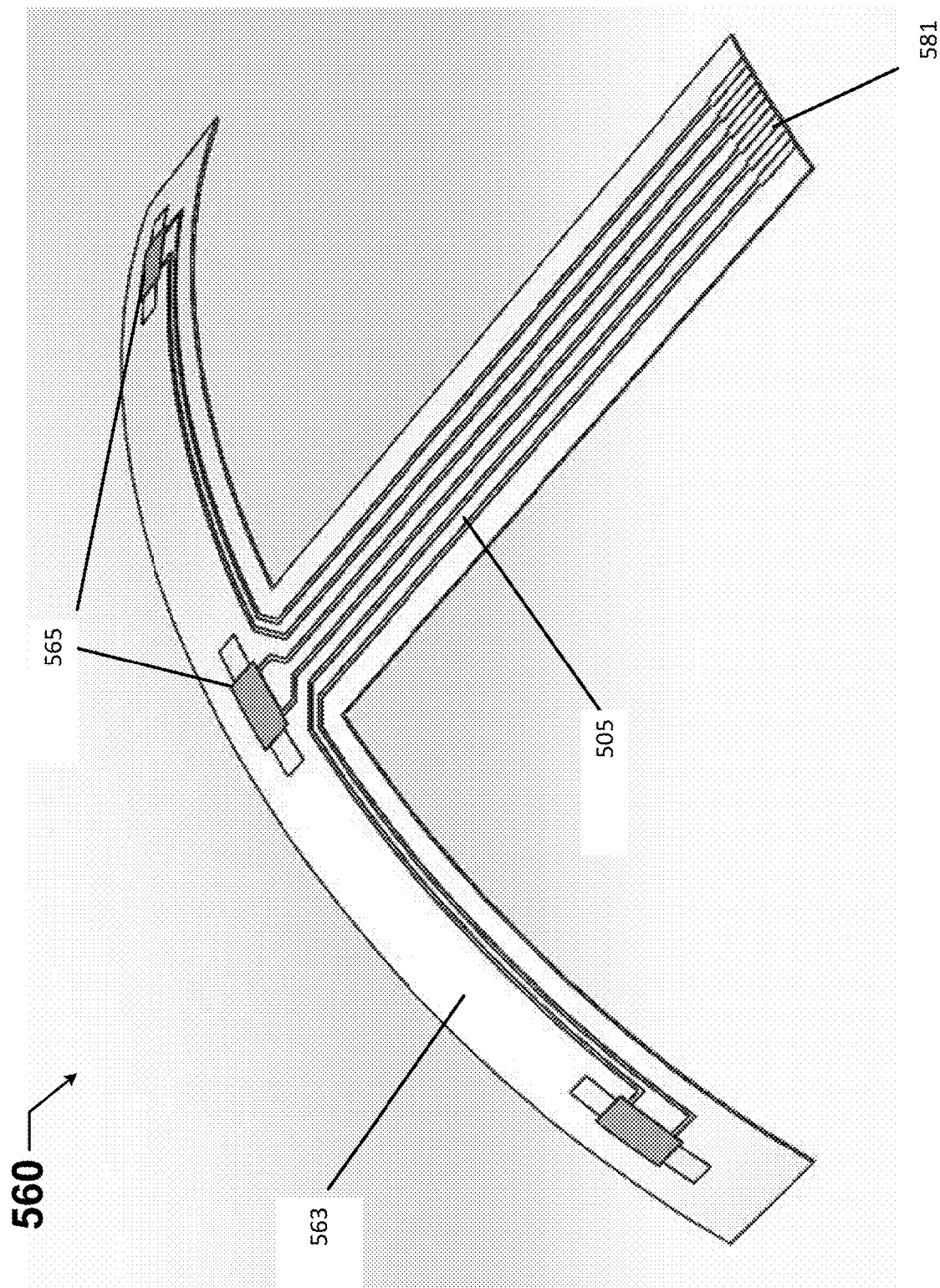
FIG. 5 shows a sensor module in accordance with certain example embodiments.

FIG. 5 shows a sensor module 560 in accordance with certain example embodiments. Referring to FIGS. 1-5, the sensor module 560 can include a substrate 563 on which is disposed (e.g., printed, adhered) a number (in this case, three) sensors 565, a connection tail 581, and one or more communication links 505 (e.g., electrically conductive leads) that connect the connection tail 581 to the various sensors 565. When laid flat, the sensor module 560 forms a "T". The various components (e.g., the substrate 563, the communication links 505, the sensors 565, the connection tail 581) of the sensor module 560 in this case is flexible, as shown in FIG. 5.

As a result, the sensor module 560 can be disposed over (e.g., adhered to) the outer surface of some portion (e.g., a housing) of a light fixture, forming a three-dimensional shape. In some cases, there can be a protective coating or film disposed over the sensor module 560 when the sensor module 560 is disposed on a component of a light fixture. In this way, such a protective coating or film can serve at least some of the same purposes as the protective cover 492 described above with respect to FIG. 4.

Figure 6:
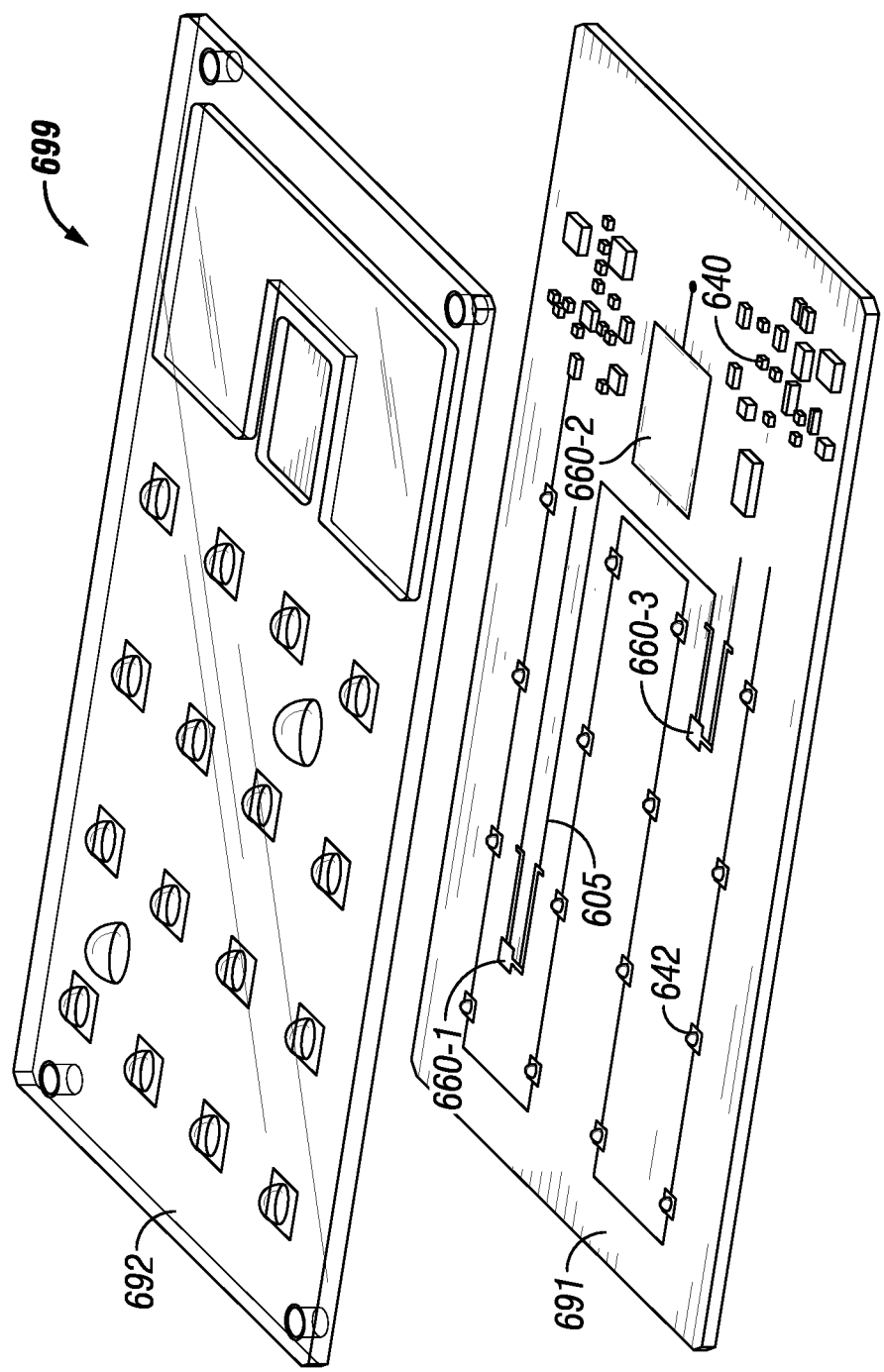
FIG. 6 shows a subassembly of another light fixture in accordance with certain example embodiments.

FIG. 6 shows a subassembly 699 of another light fixture in accordance with certain example embodiments. Referring to FIGS. 1-6, the subassembly 699 of FIG. 6 does not include a housing of a light fixture, but rather includes only a lens 692 that covers a circuit board 691 on which are disposed a number of light sources 642. Also disposed on the circuit board 691 are a power source 640 and three sensor modules 660 (sensor module 660-1, sensor module 660-2, and sensor module 660-3), all of which are electrically coupled to each other using communication links 605, which in this case are trace wiring on the circuit board 691.

The sensor modules 660 (or portions thereof) can be disposed on any portion of the circuit board 691. In this case, sensor module 660-1 and sensor module 660-3 include an ambient light sensor and are disposed on (integrated with) the outer surface of the circuit board 691 adjacent to some of the light sources 642, giving sensor module 660-1 and sensor module 660-3 a line of sight, through the lens 692, to the ambient environment.

Sensor module 660-2 can include a motion sensor and is disposed on (integrated with) the outer surface of the circuit board 691 adjacent to the power source 640, giving the sensor module 660-2 a line of sight, through the lens 692, to the ambient environment. If some or all of these components of the sensor modules 660 are printed on the circuit board 691, then any of a number of printing techniques, such as those shown in FIGS. 7A-9 below, can be used to print the sensor modules 660 onto the outer surface of the circuit board 691. For example, an additive printing technique can be used.

The circuit board 691 can be constructed from any of a number of materials, including but not limited to FR4, MCPCB (metal core pcb), flex circuit, and TFPCB (thick film pcb). The advantage of printing portions of a sensor module 660 directly to the circuit board 691, as opposed to on an intervening substrate that would be mounted on the circuit board, is that the connections from the sensor module 660 to the power source 640, the controller, and/or other components of the light fixture are made at the circuit board level, resulting in more reliable electrical connections.

Figure 7A:
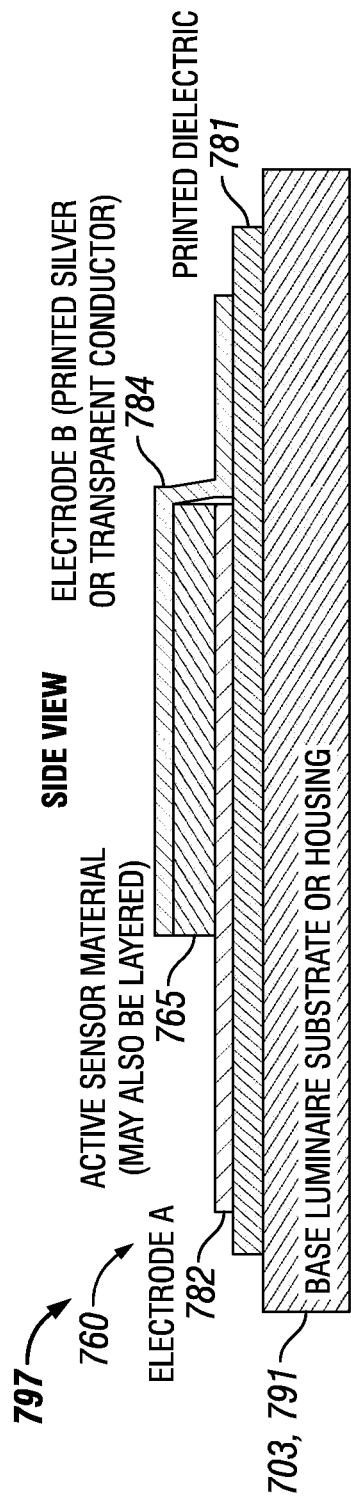
FIGS. 7A and 7B show another subassembly of a light fixture that includes a sensor module in accordance with certain example embodiments.
Figure 7B:
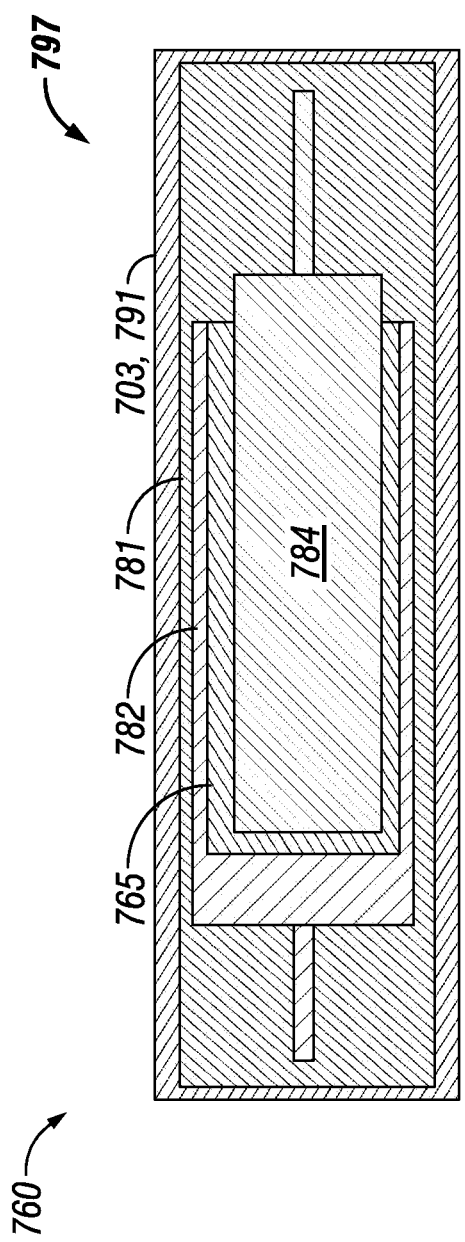

FIGS. 7A and 7B show another subassembly 797 of a light fixture that includes a sensor module 760 in accordance with certain example embodiments. Referring to FIGS. 1-7, the subassembly 797 of FIG. 7 shows one way in which the sensor module 760 can be disposed on some substrate (e.g., the housing 703, a circuit board 791 in the lighting cavity) of a light fixture. In this case, the sensor module 760 includes a number of layers. The bottom layer, disposed directly on the housing 703 or circuit board 791, is a printed dielectric 781. Layered on top of a portion of the dielectric 781 in this case is a first electrode 782, and layered on top of the first electrode 782 in this case is the sensor 765.

A second electrode 784 in this case is layered atop a different portion of the dielectric 781 relative to the first electrode 782. The second electrode 784 in this case is also layered atop the sensor 765. The first electrode 782 and the second electrode 784 can each have a connection tail (hidden from view) for coupling the sensor module 760 to some other component (e.g., a controller, a power source) of the light fixture. The first electrode 782 and the second electrode 784 can each be made of an electrically conductive material that is opaque (e.g., silver, aluminum, copper) or transparent (e.g., Pedot/PSS (poly(3,4-ethylenedioxythiophene)-poly (styrenesulfonate)), silver nano-wire, indium tin oxide).

Figure 8:
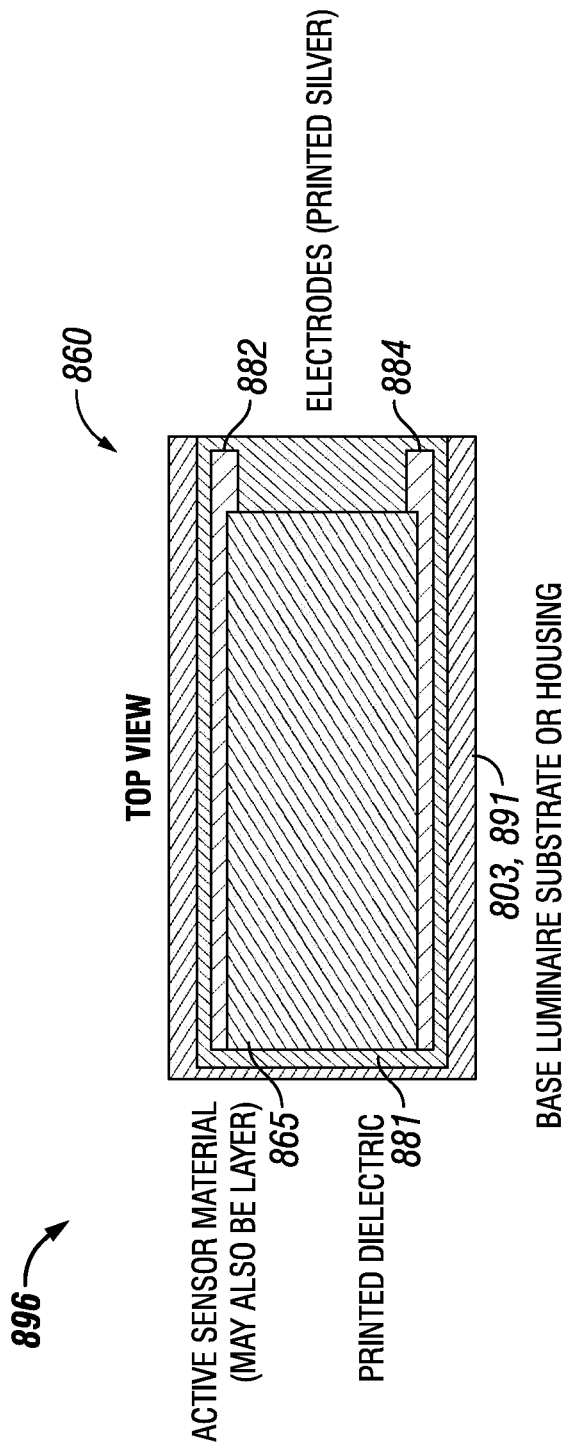
FIG. 8 shows yet another subassembly of a light fixture that includes a sensor module in accordance with certain example embodiments.

FIG. 8 shows yet another subassembly 896 of a light fixture that includes a sensor module 860 in accordance with certain example embodiments. Referring to FIGS. 1-8, the subassembly 896 of FIG. 8 shows one way in which the sensor module 860 can be disposed on some substrate (e.g., the housing 803, a circuit board 891 in the lighting cavity) of a light fixture. In this case, the sensor module 860 includes a number of layers. The bottom layer, disposed directly on the housing 803 or circuit board 891, is a printed dielectric 881.

Layered on top of a portion (e.g., a top portion) of the dielectric 881 in this case is a first electrode 882, and layered on top of another portion (e.g., a bottom portion) of the dielectric 881 is a second electrode 884. The first electrode 882 and the second electrode 884 avoid direct contact with each other. The first electrode 882 and the second electrode 884 can each have a connection tail (hidden from view) for coupling the sensor module 860 to some other component (e.g., a controller, a power source) of the light fixture. The first electrode 882 and the second electrode 884 can each be made of an electrically conductive material (e.g., silver, aluminum, copper). Disposed atop the first electrode 882 and the second electrode 884 is the sensor 865.

Figure 9:
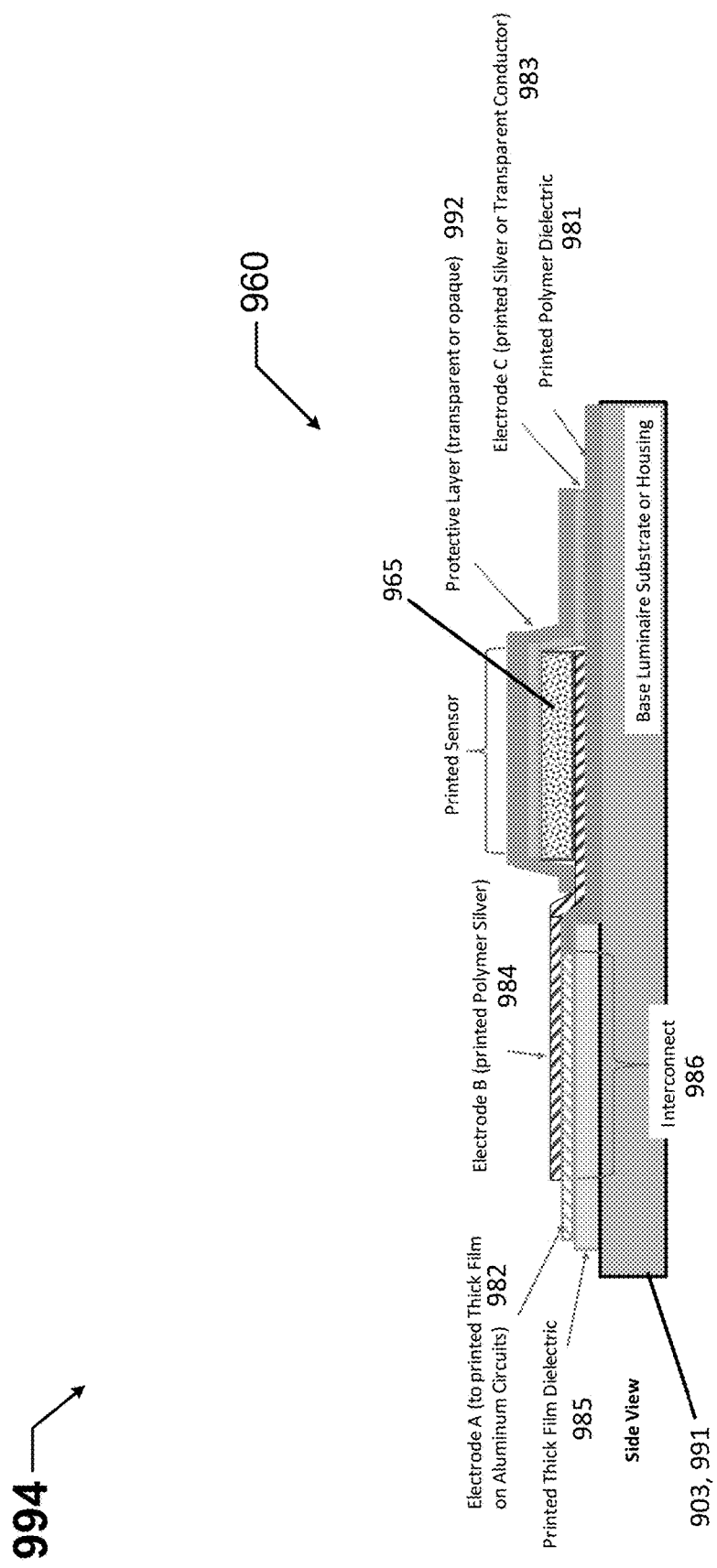
FIG. 9 shows still another subassembly of a light fixture that includes a sensor module in accordance with certain example embodiments.

FIG. 9 shows still another subassembly 994 of a light fixture that includes a sensor module in accordance with certain example embodiments. Referring to FIGS. 1-9, the subassembly 994 of FIG. 9 shows one way in which the sensor module 960 can be disposed on some substrate (e.g., the housing 903, a circuit board 991 in the lighting cavity) of a light fixture. In this case, the sensor module 960 includes a number of layers. A bottom layer, disposed directly on the housing 903 or circuit board 991, is a printed polymer dielectric 981 (e.g., printed thick film on aluminum circuits), and printed directly on another part of the housing 903 or circuit board 991 is a printed thick film dielectric 985. In this case, dielectric 981 and dielectric 985 abut against each other, and part of dielectric 981 is disposed atop part of dielectric 985.

Layered on top of the dielectric 985 in this case is a first electrode 982, which also abuts against the portion of the dielectric 981 that is disposed atop part of dielectric 985. Layered on top of the first electrode 982 and part of the dielectric 981 is a second electrode 984. Where the first electrode 982 and the second electrode 984 overlap (make direct contact with each other) can be called the interconnect 986. The second electrode 984 is also layered on top of another portion of the dielectric 981 that is not disposed on top of dielectric 985.

The first electrode 982 and the second electrode 984 can each have a connection tail (hidden from view) for coupling the sensor module 960 to some other component (e.g., a controller, a power source) of the light fixture. Layered on top of part of the second electrode 984, indirectly atop the dielectric 981, is the sensor 965. Layered over the sensor 965 and at least part of the dielectric 981 that is not covered by electrode 984 is another electrode 983 (e.g., printed silver, transparent conductor). Finally, layered atop the electrode 983 and part of electrode 984 is a protective layer 992 (e.g., transparent, opaque).

In one or more example embodiments, example embodiments can be integrated directly with a light fixture (or other electrical device) or with a component (e.g., an identification medium) that is directly coupled to a light fixture (or other electrical device). Example embodiments can be printed so that the sensor module (or portions thereof) have a very low or non-existent protruding profile. Color matching can be used to blend the sensor module (or portions thereof) into the light fixture. One or more sensor modules (or portions thereof) can be disposed at locations on the light fixture to provide maximum range with little or no signal interference by the light fixture. Example sensor modules can include multiple sensors that cover a volume of space in three dimensions. Example embodiments can provide reliable, real-time capability of a sensor module within a volume of space. Using example embodiments described herein can improve communication, safety, maintenance, costs, and operating efficiency.

Accordingly, many modifications and other embodiments set forth herein will come to mind to one skilled in the art to which integrated sensor modules for light fixtures pertain having the benefit of the teachings presented in the foregoing descriptions and the associated drawings. Therefore, it is to be understood that integrated sensor modules for light fixtures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A light fixture disposed in an ambient environment, wherein the light fixture comprises:
at least one light source; and
a sensor module that measures a parameter, wherein the parameter is used to operate the at least one light source, wherein the sensor module is disposed on an exposed component, wherein the exposed component has a substantially unobstructed line of sight with the ambient environment, wherein the sensor module is used to measure the parameter in the ambient environment, wherein the sensor module comprises a plurality of components, wherein each of the plurality of components is precisely printed as a functional layer with first finite dimensions on at least one of a substrate and at least one other component printed as at least one other functional layer with second finite dimensions, wherein at least a portion of the sensor module is printed on the exposed component, and wherein at least one ink used to print the functional layer provides electrical connectivity between the sensor module and the at least one light source.

2. The light fixture of claim 1, wherein the sensor module comprises an ambient light sensor, and wherein the parameter is an amount of ambient light in the ambient environment.

3. The light fixture of claim 2, wherein the sensor module lacks a lens.

4. The light fixture of claim 1, wherein the exposed component comprises an outer surface of a housing of the light fixture.

5. The light fixture of claim 4, wherein the sensor module is disposed in three dimensions.

6. The light fixture of claim 4, wherein the sensor module is configured to measure the parameter within a targeted volume of space in the ambient environment.

7. The light fixture of claim 1, wherein the exposed component comprises a circuit board disposed within a lighting cavity.

8. The light fixture of claim 1, wherein the exposed component comprises a lens of the light fixture.

9. The light fixture of claim 1, wherein the sensor module comprises a connection tail that couples to a coupling feature of an additional component of the light fixture.

10. The light fixture of claim 9, wherein the connection tail traverses a thickness of the exposed component.

11. The light fixture of claim 9, wherein the coupling feature of the additional component is coupled to a controller.

12. The light fixture of claim 1, wherein the exposed component is an information medium that is coupled to an outer surface of a housing of the light fixture.

13. The light fixture of claim 1, wherein the at least one light source is located remotely from the substrate and the plurality of components of the sensor module.

14. The light fixture of claim 1, wherein the substrate is adhered to the exposed component of the light fixture.

15. A sensor module for a light fixture, the sensor module comprising:
- a first dielectric configured to be printed on a substrate of the light fixture;
- a first electrode printed atop the first dielectric, wherein the first electrode comprises a first connection tail;
- a second electrode printed atop the first dielectric, wherein the second electrode comprises a second connection tail that is configured to couple to a first component of the light fixture;
- a sensor in direct communication with the second electrode; and
- a second dielectric configured to be printed on the substrate of the light fixture,
- wherein the second electrode is printed using at least one ink that provides electrical connectivity between the sensor and the first connection tail,
- wherein the first electrode is printed directly atop the second dielectric,
- wherein the second electrode is printed directly atop the first electrode.

16. The sensor module of claim 15, further comprising: a protective layer disposed directly atop the sensor.

17. The sensor module of claim 16, wherein the protective layer is opaque.

18. The sensor module of claim 15, wherein the substrate is configured to be adhered to a housing of the light fixture.

19. A light fixture disposed in an ambient environment, wherein the light fixture comprises:
- at least one light source; and
- a sensor module that measures a parameter, wherein the parameter is unrelated to operation of the at least one light source, wherein the sensor module is disposed on an exposed component, wherein the exposed component has a substantially unobstructed line of sight with the ambient environment, wherein the sensor module is used to measure the parameter in the ambient environment, wherein the sensor module comprises a plurality of components, wherein each of the plurality of components is precisely printed as a functional layer with first finite dimensions on at least one of a substrate and at least one other component printed as at least one other functional layer with second finite dimensions, wherein at least a portion of the sensor module is printed on the exposed component, and wherein at least one ink used to print the functional layer provides electrical connectivity between the sensor module and the at least one light source.

20. The light fixture of claim 19, wherein the parameter measured by the sensor module comprises at least one of a group consisting of air quality, temperature of the exposed component, and strain on the exposed component.

* * * * *